March 23, 1971 R. R. ROBINSON 3,572,335
CERVICAL IMPLANT METHOD AND DEVICE
Filed Jan. 10, 1969

INVENTOR
Ralph R. Robinson

BY Schmidt, Johnson, Hovey,
Williams & Bradley:
ATTORNEYS.

United States Patent Office 3,572,335
Patented Mar. 23, 1971

3,572,335
CERVICAL IMPLANT METHOD AND DEVICE
Ralph R. Robinson, P.O. Box 668,
Middlesboro, Ky. 40965
Filed Jan. 10, 1969, Ser. No. 790,272
Int. Cl. A61m 5/00
U.S. Cl. 128—217                                4 Claims

ABSTRACT OF THE DISCLOSURE

A device having an elongated outer tube housing an inner tube which presents a sharpened end exteriorly of the outer tube adapted for penetrating the tissues of the uterus, there being a plunger extending into the opposite end of the outer tube for ejecting a pointed capsule containing a diffusible contraceptive ingredient into said tissues. Stop means are provided on the device for limiting the penetration of the inner tube into the uterus.

---

This invention relates to implantation devices and their use and, more particularly, to a method and a device for placing a contraceptive ingredient-carrying capsule between the tissue layers of the uterus at the cervix.

The practice of implanting capsules containing a contraceptive ingredient beneath the surface of the skin at various exterior parts of the body has somewhat fallen in disrepute owing to the fact that such positioning of the capsules has sometimes left unsightly lesions or lumps on the body of the host. Implantation heretofore conventionally involved a minor surgical operation wherein an incision was made in the skin of the would-be host, the capsule inserted, and the incision was then sutured to retain the capsule. Utilizing an inconspicuous location for the capsule implant could require that it be placed at such a distance from the ovaries as to produce inconsistent and thus undesirable results.

It is, therefore, an important object of the instant invention to provide a method of implanting the contraceptive ingredient-carrying capsule into the soft, nerveless tissue at the cervix end of the uterus, thereby avoiding the undesirable features of earlier implantation methods as discussed above.

It is a further important object of the present invention to provide a method of implanting a pointed capsule into such tissue which method involves steps which may be easily and safely carried out by a physician without the necessity for relatively expensive equipment or the use of hazardous and disfiguring surgical techniques.

Another important object of the present invention is the provision of a device for implanting a capsule containing a diffusible contraceptive ingredient into body tissue of the host disposed within the uterus area such that a more effective means of birth control is established by virtue of the proximate location of the capsule relative to the ovaries.

Another important object of the present invention is the provision of an inexpensive and highly efficient device for safely and painlessly implanting a capsule containing a contraceptive ingredient within the muscular layer of the uterus at the cervix end thereof.

Figure 1:
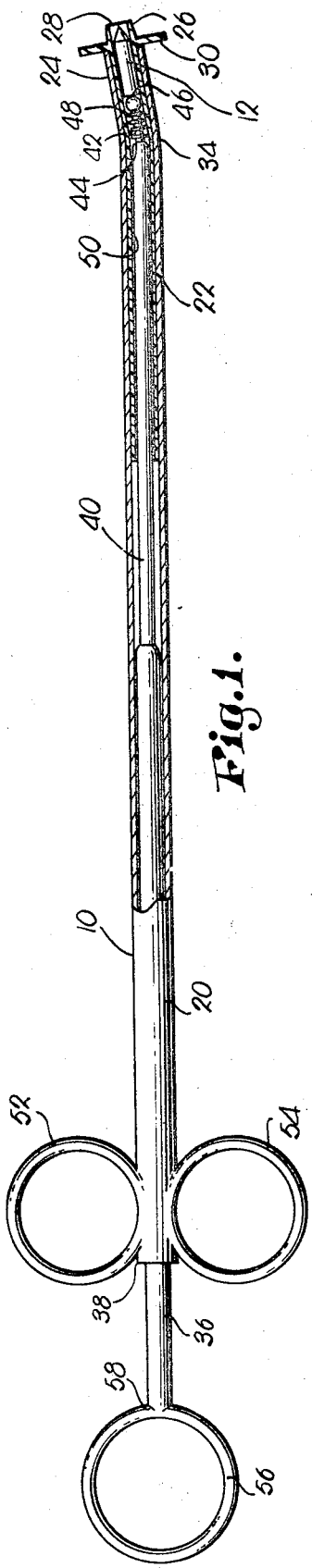
FIG. 1 is a side elevational view of a cervical implant device made pursuant to my invention and capable of carrying out my novel method, parts being broken away and shown in cross section to show details of construction.
Figure 2:
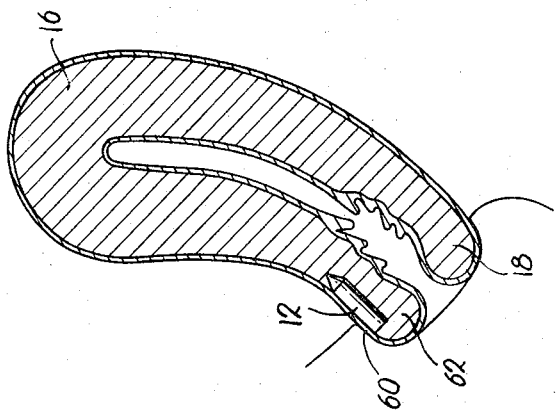
FIG. 2 is a cross-sectional, somewhat diagrammatic view showing a capsule imbedded within the muscular layer of the uterus.
Figure 4:
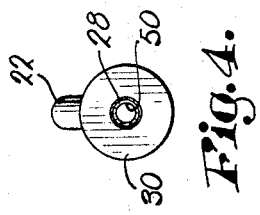
FIG. 4 is an end elevational view thereof.
Figure 3:
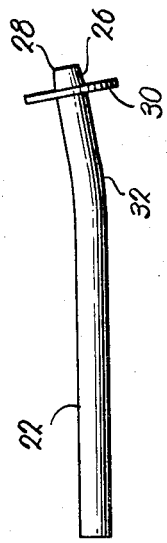
FIG. 3 is a side elevational view of the inner tube which is normally housed within the device.
Figure 5:
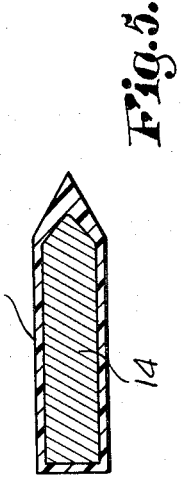
FIG. 5 is an enlarged vertical cross-sectional view taken substantially centrally through the capsule.

The device of the present invention is denoted generally by the numeral 10 and is adapted for implanting a pointed capsule 12 cointaining an adjuvant and a contraceptive ingredient 14 into the soft tissues of the uterus 16 at the cervix 18.

The device 10 has elongated tubular structure in the nature of an outer tube 20 and an inner tube 22 extending in telescoped relationship within the outer tube 20 at its forward end 24. Extending outwardly beyond the end 24 is a portion 26 of the inner tube 22 which has its forwardmost end 28 sharpened to permit penetration of the tissues in cervix 18. A disc 30 on portion 26 proximal end 24 provides means for limiting the extent of the penetration of portion 26 into the cervix 18.

The inner tube 22 is adapted to receive the capsule 12 forwardly of a bend 32 in the inner tube. A corresponding bend 34 in the outer tube 20 permits accurate location of the end 28 at the cervix 18 for implantation of the capsule 12.

A plunger 36 extends into the opposite end 38 of the outer tube 20 and is shiftably disposed therein for ejecting the capsule 12 into the cervix 18. A central stretch 40 of the plunger 36 is received by the inner tube 22 and has an extension 42 projecting beyond the terminus 44 of stretch 40 in abutting relation with the rear 46 of capsule 12. The extension 42 is smaller in diameter than stretch 40 to facilitate travel of extension 42 through the bend 32 during ejection of the capsule 12. A plurality of supporting flutes 48 are carried by the extension 42 and slidingly engage the inner surface 50 of tube 22.

Disposed at the end 38 on outer tube 20 are a pair of finger engaging loops 52 and 54. A thumb engaging loop 56 on the outer end 58 of plunger 36 is utilized in cooperation with loops 52 and 54.

The mucosa layer 60 and muscular layer 62 at the cervix 18 contain no pain fibers so that implantation of the capsule 12 may be accomplished without necessitating the use of a sleep inducing drug or a local anesthetic. Additionally, locating the capsule 12 at this point enhances the effectiveness of the capsule as a contraceptive due to its proximate relationship to the ovaries of the host.

In use the plunger 36 is withdrawn slightly from device 10 to permit insertion of the capsule 12 into end 28 of inner tube 22 with the pointed end of the capsule 12 facing outwardly as shown in FIG. 1. Upon insertion of the device 10, end 28 is forced into the soft muscular layer 62 adjacent the mucosa layer 60 until the disc 30 abuts the end of the cervix 18. Plunger 36 is then depressed to eject the capsule 12 from the inner tube 22 which causes capsule 12 to become imbedded within layer 62.

The device 10 is then removed from the host and the uterus 16 may be sutured at the zone of penetration of portion 26 at the discretion of the physician in order to more firmly hold the capsule 12 in place. The contraceptive ingredient 14 is absorbed into the bloodstream of the host and by its nearness to the ovaries provides an effective means of birth control.

Having thus described the invention, what is claimed as new and desired to be secured by Letters Patent is:

1. A device for implanting a pointed capsule containing an adjuvant and a contraceptive ingredient into the tissues of the uterus at the cervix, said device comprising:
   elongated tubular structure having a sharpened end adapted to penetrate said tissues, said structure having stop means for limiting the extent of such penetration, said structure being adapted to receive the capsule at said end of the structure with the point of the capsule facing outwardly; and a plunger extending into said structure at the opposite end of the latter for ejecting said capsule into the tissues when said sharpened end is inserted into said tissues as limited by said stop means.

2. A device for implanting a pointed capsule as claimed in claim 1, said structure including an inner and an outer tube.
said sharpened end and said stop means being on the inner tube exteriorly of the outer tube,
said inner tube being adapted to receive the capsule.

3. The method of implanting a pointed capsule containing an adjuvant and a contraceptive ingredient into the tissues of the uterus at the cervix, said method comprising the steps of:

forcing a sharpened end of a capsule-containing tube into said tissues;

limiting the extent of penetration of said end of the tube into the tissues;

ejecting the capsule from the tube with the pointed end of the capsule leading until the capsule becomes imbedded within the tissues; and removing the sharpened end of the tube from said tissue, leaving the capsule imbedded in the tissues.

4. The method of implanting a pointed capsule as claimed in claim 3; and suturing the uterus at the zone of penetration by said sharpened end.

References Cited

UNITED STATES PATENTS

| | | | |
|---|---|---|---|
| 3,016,895 | 1/1962 | Sein | 128—217 |
| 3,058,465 | 10/1962 | Bell | 128—217 |

ADELE M. EAGER, Primary Examiner

U.S. Cl. X.R.

128—264